(12) United States Patent
Nishida et al.

(10) Patent No.: US 9,746,494 B2
(45) Date of Patent: Aug. 29, 2017

(54) SPECIMEN SUPPORT AND SCANNING PROBE MICROSCOPE

(71) Applicant: THE FOUNDATION FOR THE PROMOTION OF INDUSTRIAL SCIENCE, Tokyo (JP)

(72) Inventors: Shuhei Nishida, Tokyo (JP); Teruo Fujii, Tokyo (JP)

(73) Assignee: THE FOUNDATION FOR THE PROMOTION OF INDUSTRIAL SCIENCE, Tokyo (JP)

( * ) Notice: Subject to any disclaimer, the term of this patent is extended or adjusted under 35 U.S.C. 154(b) by 0 days.

(21) Appl. No.: 15/120,369

(22) PCT Filed: Feb. 19, 2015

(86) PCT No.: PCT/JP2015/054553
§ 371 (c)(1),
(2) Date: Aug. 19, 2016

(87) PCT Pub. No.: WO2015/133284
PCT Pub. Date: Sep. 11, 2015

(65) Prior Publication Data
US 2017/0059610 A1    Mar. 2, 2017

(30) Foreign Application Priority Data
Mar. 7, 2014   (JP) .................................. 2014-044827

(51) Int. Cl.
*G01Q 30/20* (2010.01)
*G01Q 30/14* (2010.01)
*G01Q 60/24* (2010.01)

(52) U.S. Cl.
CPC ............. *G01Q 30/20* (2013.01); *G01Q 30/14* (2013.01); *G01Q 60/24* (2013.01)

(58) Field of Classification Search
CPC ......... G01Q 30/14; G01Q 30/20; G01Q 60/24
(Continued)

(56) References Cited

U.S. PATENT DOCUMENTS

2005/0199047 A1* 9/2005 Adams .................. G01Q 60/42
73/105
2005/0228610 A1* 10/2005 Kousaka ................ G01N 15/02
702/128
(Continued)

FOREIGN PATENT DOCUMENTS

JP    2003-315245 A    11/2003
JP    2005-533502 A    11/2005
(Continued)

OTHER PUBLICATIONS

English Language Translation of International Search Report in Corresponding PCT Application PCT/JP2015/054553 dated September 13, 2016.

*Primary Examiner* — Michael Maskell
(74) *Attorney, Agent, or Firm* — Bacon & Thomas, PLLC (57) ABSTRACT

The present invention makes it possible to easily and efficiently observe a specimen contained in a fluid without using a filtration device separate from a scanning probe microscope by attaching a filter holding part holding a filter to a fluid cell of a specimen support. Therefore, a specimen support 10, for holding a specimen subject to observation by the scanning probe microscope, comprises a fluid cell 11, into which fluid including the specimen is introduced, and a filter unit including a filter 15, which allows the fluid passage and at least a part of the specimen is adhered to. The fluid cell 11 includes a fluid entrance, the filter unit includes a fluid exit opening, and the filter unit is attached to one side of the fluid cell 11.

7 Claims, 5 Drawing Sheets

(58) Field of Classification Search
USPC .............................. 850/8, 12, 14, 15, 18, 33
See application file for complete search history.

(56) References Cited

U.S. PATENT DOCUMENTS

2006/0073585 A1* 4/2006 McDevitt ................. C12Q 1/04
                                                                                                       435/288.7
2012/0278958 A1* 11/2012 Yu .......................... B82Y 15/00
                                                                                                        850/33

FOREIGN PATENT DOCUMENTS

JP        2009-236513 A    10/2009
WO    WO2014/016952 A1    1/2014

* cited by examiner

SPECIMEN SUPPORT AND SCANNING PROBE MICROSCOPE

TECHNICAL FIELD

The present invention relates to a specimen support and a scanning probe microscope.

BACKGROUND ART

Hitherto, for observing minute specimens, a scanning probe microscope (SPM), such as an atomic force microscope (AFM), has been employed.

The scanning probe microscope is a general term of a kind of microscope for measuring surface forms and physical properties of specimens subject to observation by detecting a various physical quantities working between the specimens and a sharp-pointed tip of probe. The atomic force microscope is an equipment for imaging rugged forms of specimens subject to observation by detecting interactions working between the specimens and a probe maintained nearby the specimens, as changes of displacement or vibration character of a cantilever or a tuning fork, to a tip of which the probe is attached, and by scanning surfaces of the specimens with keeping constant magnitudes of the interactions.

A specimen support for holding the specimens subject to observation by the scanning probe microscope is produced, in general, by cutting out materials of resin or metal. The specimen support is, in general, employed as being attached to a scanner for scanning the specimen surface in two dimensional directions and for controlling a distance between the probe and the specimen. The specimen is fixed to the specimen support by adhesive. When the specimen is too minute to be fixed directly, it is fixed onto a plain surface of substrate of mica or graphite, and then the substrate is fixed to the specimen support. When the specimen is a matter (e.g. a cell) suspended in liquid, it is adsorbed onto a surface of a filter, such as a membrane filter, by sucking and filtrating the liquid through the filter, and then the filter is fixed to the specimen support (see, for example, Non-Patent Documents 1 and 2).

PRIOR ART DOCUMENT

Non-Patent Document

Non-Patent Document 1: Kazuhiro Kogure, "Application of AFM to Marine Bacteria", Electron Microscope, vol. 38, No. 2 (2003), pp. 83-85.
Non-Patent Document 2: T. Nishino, E. Ikemoto, and K. Kogure, "Application of Atomic Force Microscopy to Observation of Marine Bacteria", Journal of Oceanography, vol. 60, 2004, pp. 219-225.

SUMMARY OF INVENTION

Technical Problem

However, in case of the aforementioned conventional specimen support, a filtration device separate from the scanning probe microscope is necessary to be used for sucking and filtrating by the filter. Also it is necessary to detach manually the filter from the filtration device and to fix it to the specimen support. Thus an operator should stay nearby the scanning probe microscope, so that operating efficiency cannot be much improved. Also it is restrained to sample and fix the specimen to the support by remote controlling.

Further, in order to adsorb the specimen suspended in liquid onto the surface of the filter by sucking and filtrating the liquid through the filter then to fix the filter to the support, it is necessary to eliminate the liquid from the filter before fixing it to the support. And this is not available for all of the specimens, since some specimens can degenerate by eliminating the liquid.

An object of the present invention is to solve the aforementioned conventional problem and to provide a specimen support and a scanning probe microscope, which can easily and effectively observe specimens contained in liquid, without using a filtration device separate from the scanning probe microscope, by attaching a filter unit to a fluid cell of the specimen support.

Solution to Problem

Accordingly, the present invention provides a specimen support for holding a specimen subject to observation by a scanning probe microscope, the specimen support comprising: a fluid cell, into which fluid including the specimen is introduced; and a filter unit including a filter, which allows the fluid passage and to which at least a part of the specimen is adhered; the fluid cell including a fluid entrance, the filter unit including a fluid exit opening, and the filter unit being attached to one side of the fluid cell.

In another specimen support, the fluid is introduced through the fluid entrance in the fluid cell and, after passing the filter, is exhausted through the fluid exit opening.

In yet another specimen support, quantity of the specimen adhered to the filter varies according to total amount of the fluid, which is introduced through the fluid entrance in the fluid cell and is exhausted through the fluid exit opening.

In yet another specimen support, the fluid cell includes a probe unit observing the specimen adhered to the filter.

In yet another specimen support, the specimen adhered to the filter is observed in the fluid by the probe unit.

In yet another specimen support, the filter unit is attached to a scanner and is fluid-tightly attached to the fluid cell so that the filter unit is displaceable in reference to the probe unit.

In yet another specimen support, the probe unit is attached to the fluid cell via the scanner.

In yet another specimen support, the specimen adhered to the filter is removed therefrom when detergent fluid is introduced through fluid exit opening.

In yet another specimen support, the scanning probe microscope is an atomic force microscope.

Also the present invention provides the scanning probe microscope including the specimen support.

Advantageous Effects of Invention

According to the present invention, it is possible to provide a specimen support and a scanning probe microscope, which can easily and effectively observe specimens contained in fluid.

DESCRIPTION OF EMBODIMENTS

An embodiment of the present invention will be described in detail with reference to the drawings.

Figure 1:
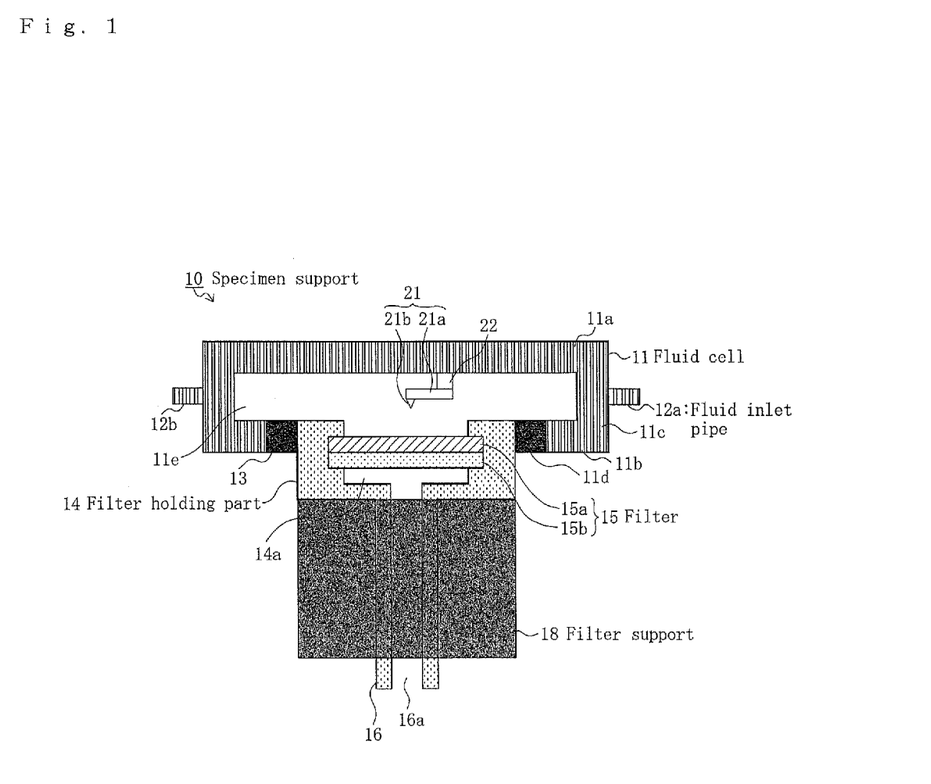
FIG. 1 is a sectional view illustrating a structure of a specimen support according to an embodiment of the present invention.

FIG. 1 is a sectional view illustrating a structure of a specimen support according to the embodiment of the present invention.

In FIG. 1, a reference numeral 10 designates a specimen support for a scanning probe microscope of the present invention, and the specimen support is a device for holding specimens subject to observation by the scanning probe microscope. The structure of the scanning probe microscope is not drawn, except for the specimen support 10.

The scanning probe microscope can be any type of microscope, as long as it can measure surface forms and physical properties of specimens subject to observation by detecting a various physical quantities working between the specimens and a sharp-pointed tip of probe as explained in Background Art, such as a scanning tunneling microscope, a scanning magnetic force microscope, a scanning SQUID microscope, a scanning hall probe microscope, a scanning Kelvin probe force microscope, a scanning Maxwell stress microscope, an electrostatic force microscope, a scanning piezo-response microscope, a scanning nonlinear dielectric microscope, a scanning near-field optical microscope, a scanning ion-conductance microscope, etc., though it is most preferable to be an atomic force microscope.

The atomic force microscope, as explained in Background Art, is an equipment for imaging rugged forms of specimens subject to observation by detecting interactions working between the specimens and a probe maintained nearby the specimens, as changes of displacement or vibration character of a cantilever or a tuning fork, to the tip of which the probe is attached, and by scanning surfaces of the specimens with keeping constant magnitudes of the interactions.

The scanning probe microscope, such as an atomic force microscope, is often attached on a heavy vibration isolation unit for eliminating external acoustic noise or the like, so that it is generally installed and used inside a laboratory for avoiding work-load of moving the equipment as a whole.

However, in recent years, small and portable scanning probe microscopes, such as atomic force microscopes, have already been put in practical use (see, for example, Non-Patent Document 3).

Non-Patent Document 3: T. Mutsuo, T. Nakazawa, T. Niino, A. Yamamoto, B. Kim, Y. Hoshi, K. Ikeda, M. Michihata, and H. Kawakatsu, "Fabricating Five Atomic Force Microscopes with an Extremely Low Budget—A Student Project-", Japanese Journal of Applied Physics, Vol. 43, No. 7B, 2004, pp. 4615-4618.

As small and portable atomic force microscopes, like scanning probe microscopes, a product named "Innova" manufactured by Bruker, one named "small general-purpose unit AFM5100N" manufactured by Hitachi High-tech Science, Ltd, one named "Easyscan2AFM", which is a modular AFM system, manufactured by Nano Surf, and one named "handi AFM" imported by Soft Works are on the market.

In the present embodiment, the scanning probe microscope will be explained as a small and portable atomic force microscope like these. Also in the present embodiment, the scanning probe microscope or atomic force microscope will be supposed to include a computer(s) or the like for controlling. Explanations will be omitted about a general structure and movement of the atomic force microscope, since they are already known as illustrated in Non-Patent Document 3.

As shown in FIG. 1, the specimen support 10 of the present embodiment comprises a fluid cell 11 and, as a filter unit, a filter holding part 14. The fluid cell 11 has a top plate 11a, a bottom plate 11b, side plates 11c and a hollow part 11e, which is an inner space defined around by the top plate 11a, bottom plate 11b and side plates 11c. The fluid cell 11 may have any shape though it preferably has a shape of depressed circular or rectangular cylinder with the mutually parallel top and bottom plates 11a, 11b, and side plate 11c connecting the side edges of the top and bottom plates 11a, 11b as shown FIG. 1.

Inside the hollow part 11e of the fluid cell 11, a probe unit 21, which functions as a probe of the atomic force microscope or the scanning probe microscope, is provided. The probe unit 21 has a cantilever 21a and a sharp-pointed probe 21b attached to a tip end of the cantilever 21a, and a base end of the cantilever 21a is attached to the fluid cell 11 via a probe fixing part 22. The probe unit 21 is attached to a top face of the fluid cell 11 composed of the top plate 11a, in the example illustrated in FIG. 1, though it may be attached to another face of the fluid cell 11. Explanations will be omitted about a structure and movement of the probe unit 21, since they are the same as those of probes of ordinary atomic force microscopes.

The probe unit 21 may be one for observing specimens by a contact mode in which the tip of the probe 21b contacts the specimens, one for observing specimens by a tapping mode in which the tip of the probe 21b is forced to vibrate, or one for observing specimens by a non-contact mode in which the tip of the probe 21b does not contact to the specimens.

The filter holding part 14 is a member for holding a filter 15 and attached to one side of the fluid cell 11. The filter holding part 14 does not necessarily need to be a member separate from the filter 15 but may be a member combined into the filter 15. The filter holding part 14 is attached to a bottom face of the fluid cell 11 composed of the bottom plate 11b, in the example illustrated in FIG. 1, though it may be attached to another face of the fluid cell 11. Although it may be a single filtrating member, the filter 15 is supposed to be composed of a laminated pair of an upper filtrating member 15a and a lower filtrating member 15b in the present embodiment.

Although it may be any kind of filter, the upper filtrating member 15a is preferable to be a member not affecting specimens chemically or physically since specimens are adhered to its surface, and it is most preferable to be a filter called a membrane-filter, which is made from such as fluorocarbon resin, cellulose acetate or the like and is a porous film with unified diameter pores. As various kinds of membrane-filters are on the market, it is possible to select appropriate ones with such a property as pore's diameter suitable to the kind of specimen subject to observation.

Although it may be any kind of filter, the lower filtrating member 15b is preferable to be a member of high strength since it is a member to support the upper filtrating member 15*a*, and it is most preferable to be a sintered filter which is a porous body made from sintered powder of metal such as stainless steel or the like. The lower filtrating member 15*b* can be omitted if not necessary.

The filter holding part 14 is attached to the bottom plate 11*b* in such a manner that it closes a bottom opening 11*d* formed in the bottom plate 11*b* of the fluid cell 11. A gap between the perimeter edges of the filter holding part 14 and the bottom opening 11*d* is closed by a resilient seal member 13. The seal member 13 may be made from any kind of material as long as it is flexibly deformable and can prevent leakage of fluid introduced into the hollow part 11*e* though it is preferable to be such as a membrane, an O-ring or the like, which is made from flexible resin such as fluorocarbon resin or the like. Accordingly, the filter holding part 14 is attached to the fluid cell 11 in such a manner that it is displaceable in reference to the fluid cell 11 and the probe unit 21 attached to the fluid cell 11, and it is attached to the fluid cell 11 fluid-tightly, that is, in such a manner that fluid, such as gas or liquid, cannot flow between the perimeter edges of the filter holding part 14 and the bottom opening 11*d*. The fluid cell 11 is fixed to a non-depicted support member immovably.

In the filter holding part 14, an outside filter hollow part 14*a*, as an outside filter space, is formed outside (lower-side in FIG. 1) of the filter 15. And, to the bottom face of the filter holding part 14, a fluid exit pipe 16, as a fluid exit opening, is connected. A communication hole 16*a* formed in the fluid exit pipe 16 communicates with the outside filter hollow part 14*a*, so that the fluid flows from the hollow part 11*e* of the fluid cell 11 through the filter holding part 14 in the outside filter hollow part 14*a* and flows outside the specimen support 10 through the communication hole 16*a* of the fluid exit pipe 16.

The bottom part of the filter holding part 14 is attached to a filter support 18. The filter support 18 is a device for making the filter holding part 14 scanned, and is for example a scanner comprising an X-Y-Z piezo stage generally used for an atomic force microscope or the like. Accordingly it is possible to move the filter holding part 14 in X-Y-Z directions or in three dimensional directions in reference to the fluid cell 11 then to make the specimen, which is adhered to the surface of the upper filtrating member 15*a*, scanned by the probe 21*b* of the probe unit 21. In the example illustrated in FIG. 1, the fluid exit pipe 16 is disposed in such a manner that it goes inside the filter support 18 and its bottom end extends downwardly from the bottom surface of the filter support 18.

To one part of the side plate 11*c* of the fluid cell 11, a fluid inlet pipe 12*a* as a fluid entrance is connected and, to another part of the side plate 11*c* of the fluid cell 11, an auxiliary fluid outlet pipe 12*b* as an auxiliary fluid exit is connected. The fluid including specimens is introduced through the fluid inlet pipe 12*a* into the hollow part 11*e* of the fluid cell 11 and, after passing the filter holding part 14, is exhausted through the fluid exit pipe 16. The auxiliary fluid outlet pipe 12*b* is usually closed and unusable, but opened only when a detergent fluid introduced for cleaning inside the hollow part 11*e* is exhausted or the like, and can be omitted if unnecessary.

Next will be described the structures of the filter holding part 14 and the filter support 18 in detail.

Figure 2:
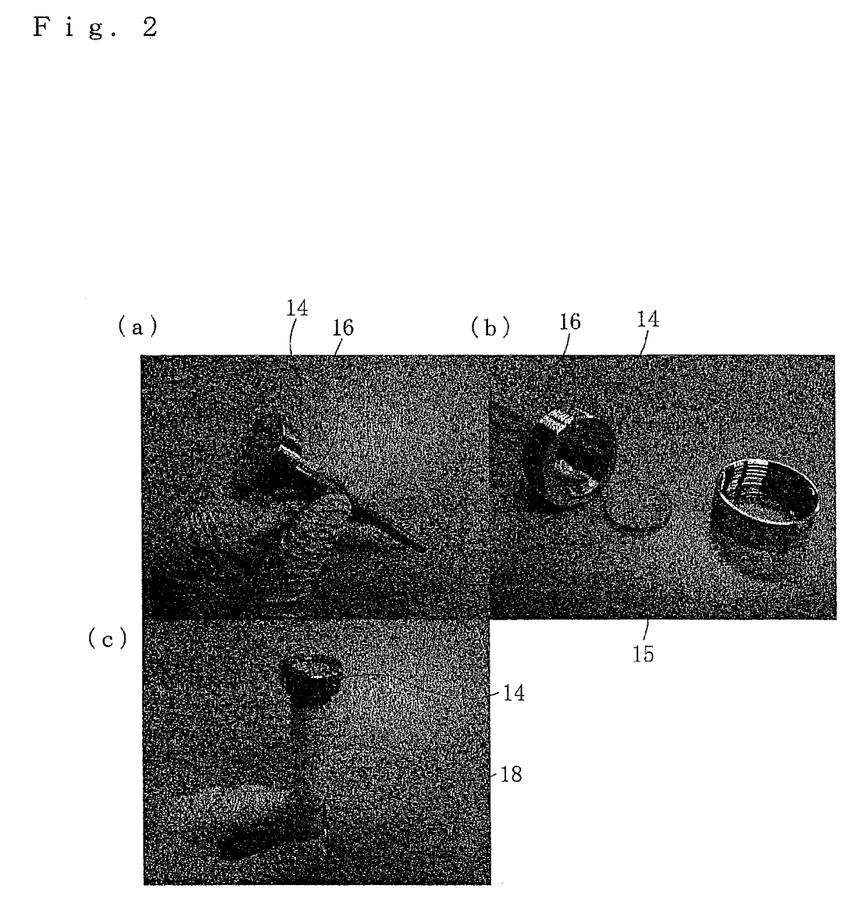
FIG. 2 is a set of photographs of a real thing of filtration part according to the embodiment of the present invention.

FIG. 2 is a set of photographs of a real thing of filtration part according to the of the present invention. In FIG. 2, (*a*) is a photograph showing a situation where the filter support is removed, (*b*) is a photograph showing a situation where the filter is removed, and (*c*) is a photograph showing a situation where the filter support is attached.

Inventors of the present invention actually made the filter holding part 14 and the filter support 18 as shown in FIG. 2. As shown in FIG. 2 (*a*), the filter holding part 14 and the fluid exit pipe 16 are formed integrally into a member of generally funnel like shape. As shown in FIG. 2 (*b*), the filter holding part 14 includes a body of cylindrical shape and a flange member screwed to the body, the filter 15 is held by being inserted between the flange member and the top end of the body. As shown in FIG. 2 (*c*), the filter support 18, functioning as a scanner, is an X-Y-Z stage composing piezo elements and having a generally circular cylindrical shape, and, when the filter holding part 14 is attached to the filter support 18, the fluid exit pipe 16 is inserted into a through-hole formed at the center of the filter support 18 of generally circular cylindrical shape.

The shapes and structures of the filter holding part 14 and the filter support 18 are shown in FIG. 2 just as examples, are not limited to these and can be modified if necessary. For example the filter holding part 14 does not have to be of a circular cylindrical shape but may be of a rectangular cylindrical shape or others. For example the fluid exit pipe 16 does not have to be connected to the bottom surface of the filter holding part 14 and to extend downwardly but may be connected to its side surface and to extend laterally. For example the filter support 18 does not have to be of a circular cylindrical shape but may be of a shape of rectangular parallelepiped or others.

Next will be described a way for introducing specimens subject to observation into the specimen support 10.

Figure 3:
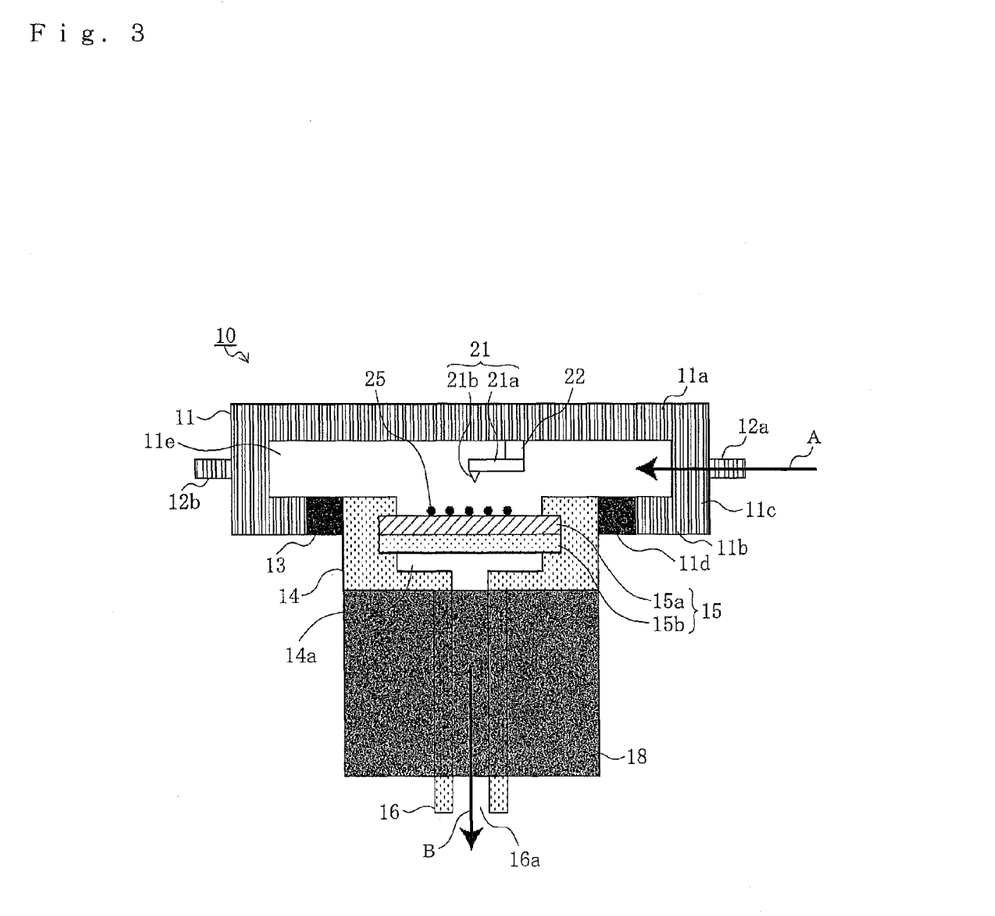
FIG. 3 is a sectional view illustrating a way for introducing specimens into the specimen support according to the embodiment of the present invention.
Figure 4:
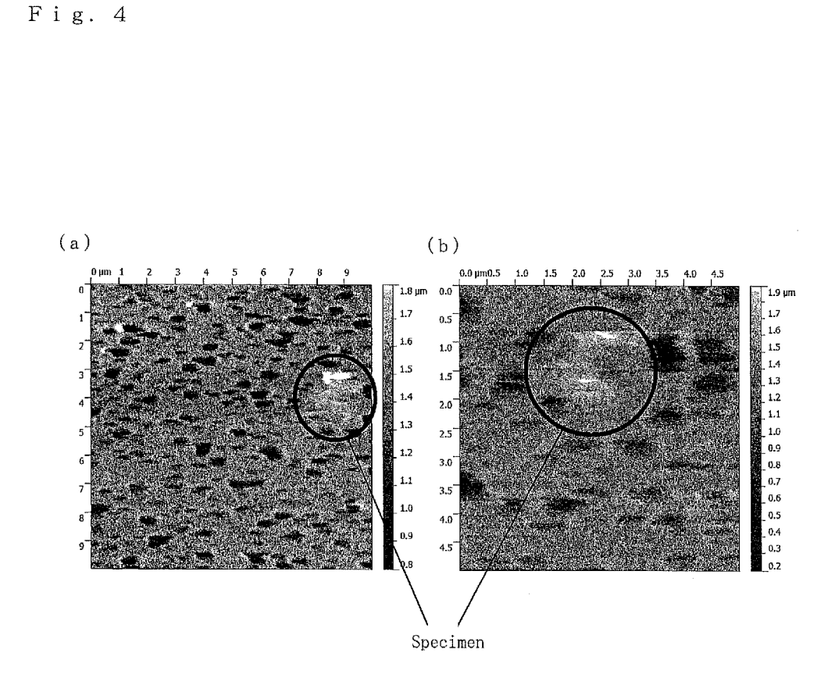
FIG. 4 is a set of photographs showing results of observation of specimens introduced into the specimen support by an atomic force microscope according to the embodiment of the present invention.

FIG. 3 is a sectional view illustrating a way for introducing specimens into the specimen support according to the embodiment of the present invention. FIG. 4 is a set of photographs showing results of observation of specimens introduced into the specimen support by the atomic force microscope according to the embodiment of the present invention. In FIG. 4, (*a*) is a microscopic photograph of low magnification, and (*b*) is a microscopic photograph of high magnification enlarging a principal part of (a).

According to the present embodiment, the fluid including specimens subject to observation is introduced through the fluid inlet pipe 12*a* into the fluid cell 11 and, after passing the filter 15, is exhausted through the fluid exit pipe 16, so that the specimens are adhered to the surface of the filter 15 to be observed. In FIG. 3, a reference numeral 25 designates an observable specimen, which is the specimen adhered to the surface of the filter 15 or, more specifically, the surface of the upper filtrating member 15*a*.

In this case, it is preferable to connect one end of a pipe conduit, the other end of which is connected to an unillustrated fluid source, to the fluid inlet pipe 12*a*, to connect one end of another pipe conduit, the other end of which is connected to an unillustrated exhausted fluid reservoir, to the fluid exit pipe 16, and to install a fluid pump in at least one of the pipe conduits for introducing the fluid into the fluid cell 11 and for exhausting the fluid from the fluid cell 11.

The fluid may be gas such as air, vapor or the like, liquid such as water or the like, or liquid-vapor two-phase flow, which is mixture of liquid and vapor. The specimen may be for example a microorganism, a biomolecule, a dust, a metal particle, a mineral particle, an organic particle, an inorganic particle or the like in air or in water, and may be any kind of matter as long as it can be subject to observation by the scanning probe microscope.

Herein will be explained, for a convenience of explanation, a case that the fluid is sea water and the specimen is a microorganism in sea water. It is a well-known technology to make the probe unit 21 usable in water or in liquid (see, for example, Patent Documents 1-3).

Patent Document 1: Japanese Patent Application Laid-Open (Kokai) No. Heisei 07-174767 (JP 07-174767 A)
Patent Document 2: Japanese Patent Application Laid-Open (Kokai) No. Heisei 10-170527 (JP 10-170527 A)
Patent Document 3: Japanese Patent Application Laid-Open (Kokai) No. 2000-065711 (JP 2000-065711 A)

In this case, the sea water is drawn by an unillustrated pump and is introduced through the fluid inlet pipe 12a into the hollow part 11e of the fluid cell 11, as indicated by an arrow A in FIG. 3. The sea water introduced in the hollow part lie flows through the upper filtrating member 15a and the lower filtrating member 15b into the outside filter hollow part 14a, then flows outside the specimen support 10 through the communication hole 16a of the fluid exit pipe 16 from the outside filter hollow part 14a, as indicated by an arrow B in FIG. 3. The auxiliary fluid outlet pipe 12b is supposed to be closed.

If the atomic force microscope is of a small and portable type, it is possible to carry it on a ship into a desired sea area, to fetch sea water of the area and to introduce the fetched sea water into the hollow part lie of the fluid cell 11.

Since the specimens, such as microorganisms, included in sea water cannot go through the pores of the porous upper filtrating member 15a, at least a part of them are adhered to the surface of the upper filtrating member 15a and turn into the observable specimens 25. The diameter of the pores of the upper filtrating member 15a is selected, based on sorts of the specimens, to be smaller than the size of at least a part of the specimens. And it is possible to adopt a pre-filter for gathering specimens of a size suitable for observation. For example a porous filtrating member with pores of lager diameter than those of the upper filtrating member 15a is adopted as the pre-filter and is disposed in the fluid inlet pipe 12a or the like, so that only the specimens of smaller size than a predetermined value can be adhered to the surface of the upper filtrating member 15a.

The quantity, the number or the density per area of the observable specimens 25 adhered to the surface of the upper filtrating member 15a increases and decreases according as the total amount or the product of time and amount of flow of the sea water, introduced into the hollow part 11e of the fluid cell 11 through the fluid inlet pipe 12a and exhausted through the fluid exit pipe 16, increases and decreases. In another word, the quantity of the observable specimens 25 adhered to the upper filtrating member 15a varies according to the total amount of flow of the sea water introduced into the fluid cell 11 through the fluid inlet pipe 12a and exhausted through the fluid exit pipe 16. Therefore it is possible to adjust the quantity of the observable specimens 25 adhered to the upper filtrating member 15a by adjusting the operating speed and/or the operating time of the pump.

When the quantity of the observable specimens 25 adhered to the surface of the upper filtrating member 15a reaches a predetermined value, the observable specimens 25 can be observed by the probe unit 21 provided in the hollow part 11e of the fluid cell 11. In the observation, the operation of the pump is stopped and the filter support 18, as a scanner, is operated to displace the filter holding part 14 in three dimensional directions in reference to the fluid cell 11, so that the observable specimens 25 adhered to the surface of the upper filtrating member 15a scans in reference to the probe 21b of the probe unit 21, in the hollow part 11e filled with the sea water, and the observable specimens 25 are observed. Thus it is possible to observe the observable specimens 25 kept in the sea water or the observable specimens 25 in natural conditions. The displacement of the tip of the cantilever 21a, to which the probe 21b is attached, is possible to be detected even when the probe unit 21 is in sea water, as described in the Patent Documents 1-3.

The inventors of the present invention actually observed the specimen included in the fetched sea water by using the atomic force microscope equipped with the specimen support 10 actually made. FIG. 4 shows photographs taken by the atomic force microscope. The sea water was fetched from a hydrothermal area (2000 [m] in depth) in the sea areas called Okinawa Trough and Irabu Knoll. The upper filtrating member 15a was a membrane filter with a lot of pores of about 0.2 [μm] in diameter.

In FIG. 4 (a), plural pores of the upper filtrating member 15a are observed. In FIG. 4 (b), enlarging a principal part of FIG. 4 (a), it is observed that specimens are fixed to flat areas among pores of the upper filtrating member 15a.

Next will be described a way of discharging observed specimens from the specimen support 10.

Figure 5:
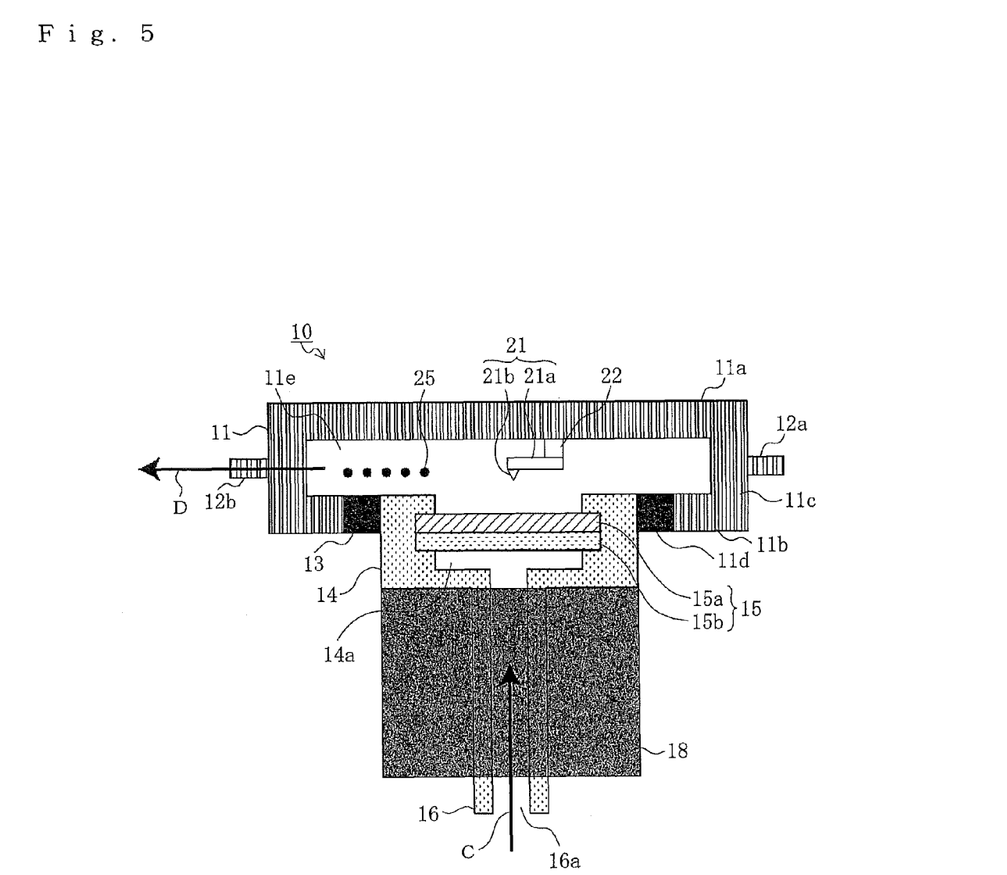
FIG. 5 is a sectional view illustrating a way for discharging specimens from the specimen support according to the embodiment of the present invention.

FIG. 5 is a sectional view illustrating a way for discharging specimens from the specimen support according to the embodiment of the present invention.

According to the present embodiment, when the observation of specimens is finished, the detergent fluid is introduced through the fluid exit pipe 16 into the outside filter hollow part 14a and, after passing through the filter 15, is exhausted through the auxiliary fluid outlet pipe 12b, so that the observed observable specimens 25 adhered to the surface of the filter 15 are removed therefrom and discharged with the detergent fluid from the fluid cell 11.

In this case, it is preferable to connect one end of a pipe conduit, the other end of which is connected to an unillustrated detergent fluid source, to the fluid exit pipe 16, to connect one end of another pipe conduit, the other end of which is connected to an unillustrated exhausted detergent fluid reservoir, to the auxiliary fluid outlet pipe 12b, and to install a fluid pump in at least one of the pipe conduits for introducing the detergent fluid into the fluid cell 11 and for exhausting the detergent fluid from the fluid cell 11.

The detergent fluid may be gas, liquid or liquid-vapor two-phase flow though it is preferably cleaning fluid such as pure water, water including detergent ingredient or the like, when the fluid including specimens is sea water as abovementioned. Herein the detergent fluid will be explained as the cleaning fluid.

In this case, the cleaning fluid is sent out by an unillustrated pump and is introduced through the communication hole 16a of the fluid exit pipe 16 into the outside filter hollow part 14a, as indicated by an arrow C in FIG. 5. The cleaning fluid introduced in the outside filter hollow part 14a flows through the upper filtrating member 15a and the lower filtrating member 15b into the hollow part 11e of the fluid cell 11. Thus the observable specimens 25 are removed from the surface of the upper filtrating member 15a. After flowing into the hollow part 11e, the cleaning fluid goes outside the specimen support 10 with the observable specimens 25 through the auxiliary fluid outlet pipe 12b, as indicated by an arrow D in FIG. 5.

The fluid inlet pipe 12a is supposed to be closed. If the auxiliary fluid outlet pipe 12b is omitted, the fluid inlet pipe 12a is opened and the cleaning fluid introduced in the hollow part 11e goes outside the specimen support 10 through the fluid inlet pipe 12a.

Even after the observed specimens are discharged from the specimen support 10, if necessary, the sea water including specimens can be introduced again for observation, as shown in FIG. 3.

Although the present embodiment has described a so called sample scanning type scanner, in which the filter support 18 functions as a scanner for scanning the filter holding part 14 and makes the specimens adhered to the surface of the upper filtrating member 15a scan in reference to the probe 21b of the probe unit 21, it is possible to adopt a so called tip scan type scanner, in which the probe 21b of the probe unit 21 scans in reference to the specimens adhered to the surface of the upper filtrating member 15a. For example the probe fixing part 22, attaching the base end of the cantilever 21a to the fluid cell 11, may be converted into a scanner comprising an X-Y-Z piezo stage or the like, so that the probe 21b attached to the tip end of the cantilever 21a can scan in reference to the specimens adhered to the surface of the upper filtrating member 15a. In this case the filter holding part 14 does not have to be displaceable in reference to the fluid cell 11.

Although the present embodiment has described the case where the specimen support 10 adopts such a posture that the surface of the filter 15, attached to the bottom plate 11b as a bottom surface of the fluid cell 11, is horizontal and on face up, as shown in FIG. 1, the specimen support 10 may adopt any posture. For example the specimen support 10 may adopt such a posture that the surface of the filter 15 is horizontal and on face down, that is, a upside-down posture, and may adopt such a posture that the surface of the filter 15 is vertical or slant, that is, a sideways posture or a slant posture.

Further, although the present embodiment has described the case where the morphology of specimen is observed by the atomic force microscope, the mechanical property of specimen may be analyzed by measuring force curve.

As explained above, according to the present invention, the filter holding part 14 for holding the filter 15, to which at least a part of specimens included in the fluid is adhered, is attached to the fluid cell 11 of the specimen support 10. Thus it is not necessary to adsorb the specimen onto the surface of the filter 15 by using a filtration device separate from the scanning probe microscope, unlike the conventional specimen support explained in Technical Problem. Also it is not necessary to detach manually the filter 15 from the filtration device and to fix it to the fluid cell 11 of the specimen support 10. Thereby the specimen can be observed effectively.

Also it is possible to adhere the specimen to the surface of the filter 15 and to observe it by remote controlling, since the operator does not have to stay nearby the scanning probe microscope.

Further the specimen support 10 comprises the fluid cell 11 and the filter holding part 14 attached to the fluid cell 11, and the fluid cell 11 includes the fluid inlet pipe 12a and the filter holding part 14 includes the fluid exit pipe 16. Thereby the fluid including the specimens is introduced through the fluid inlet pipe 12a into the fluid cell 11 and, after passing the filter 15, is exhausted through the fluid exit pipe 16, so that at least a part of the specimens is adhered to the surface of the filter 15.

Further it is possible to adjust the quantity of the specimens adhered to the filter 15 by adjusting the total amount of flow of the fluid including the specimens and to adhere the desired quantity of specimens to the filter 15.

Further it is possible to keep the fluid including the specimens contained in the hollow part 11e of the fluid cell 11, which is an enclosed space. Thereby restrictions on the kind of specimens are relieved, since it is possible to observe the specimens while they are kept in the fluid. For example it is possible to observe the specimens while they are in physiological conditions, even if they are living cells, viruses or the like.

The present invention makes it possible to control remotely the scanning probe microscope and to sample, to fix, and to observe minute specimens included in fluid in simple by easy operations. Therefore observation by the scanning probe microscope can be accomplished even in a difficult circumstance for operators to enter. For example, in a case of marine resources research, it is possible to observe minute specimens included in sea water fetched from the spot of research by installing the scanning probe microscope in the sea. Thus the present invention is of utility value as a resource probing equipment in a marine research industry.

Since the scanning probe microscope can be integrated into a liquid channel, it can be used in combination with another equipment of analysis using the liquid channel. For example it is possible to analyze more precisely cellular character by using the scanning probe microscope in combination with a flow cytometer. Thus the present invention is of utility value as an equipment of analysis for biospecimen in an equipment industry in biological and medical field.

It is possible to detect or observe for example microorganism, biomolecular, dust, metal particle, mineral particle, organic particle, inorganic particle or the like included in a various liquid such as water fetched from rivers, lakes or the like, water running in industrial or household waterworks or drainages or the like. Also it is possible to detect or observe for example microorganism, biomolecular, dust, metal particle, mineral particle, organic particle, inorganic particle or the like floating in air of indoor or outdoor. Thus the present invention is of utility value as various kinds of detecting equipment, probing equipment, analyzing equipment or the like in various industrial or hygiene industries.

The present invention is not limited to the above embodiment, but may be diversely modified and varied. Thus, the modifications and variations are not excluded from the scope of protection of the present invention.

INDUSTRIAL APPLICABILITY

The present invention is applicable to a specimen support and a scanning probe microscope.

DESCRIPTION OF REFERENCE NUMERALS

10: Specimen support
11: Fluid cell
12a: Fluid inlet pipe
14: Filter holding part
15: Filter
16: Fluid exit pipe
18: Filter support
21: Probe unit
25: Observable specimen

The invention claimed is:

1. A specimen support for holding a specimen subject to observation by a scanning probe microscope, the specimen support comprising:
   a fluid cell, into which fluid including the specimen is introduced; and
   a filter unit including a filter, which allows the fluid passage and to which at least a part of the specimen is adhered;

the fluid cell including a fluid entrance,
the filter unit including a fluid exit opening, and the filter unit being attached to one side of the fluid cell, wherein:
the fluid cell includes a probe unit
the specimen adhered to the filter is observed in the fluid by the probe unit, and
the filter unit is attached to a scanner and fluid-tightly attached to the fluid cell so that the filter unit is displaceable with respect to the probe unit.

2. The specimen support according to claim 1, wherein the fluid is introduced through the fluid entrance in the fluid cell and, after passing the filter, is exhausted through the fluid exit opening.

3. The specimen support according to claim 2, wherein quantity of the specimen adhered to the filter varies according to total amount of the fluid, which is introduced through the fluid entrance in the fluid cell and is exhausted through the fluid exit opening.

4. The specimen support according to claim 1, wherein the probe unit is attached to the fluid cell via a scanner.

5. The specimen support according to claim 1, wherein the specimen adhered to the filter is removed therefrom when detergent fluid is introduced through fluid exit opening.

6. The specimen support according to claim 1, wherein the scanning probe microscope is an atomic force microscope.

7. The scanning probe microscope including the specimen support according to claim 1.

* * * * *